United States Patent [19]

Rusterholz

[11] 4,036,531
[45] July 19, 1977

[54] VALVE FOR A PULSE-WAVE PNEUMATIC CONVEYANCE INSTALLATION

[76] Inventor: Otto Rusterholz, Via G.A. Borgese 14, Milan, Italy

[21] Appl. No.: 684,779

[22] Filed: May 10, 1976

[30] Foreign Application Priority Data

May 16, 1975 Italy .................................. 23390/75

[51] Int. Cl.² .......................................... B65G 53/58
[52] U.S. Cl. ............................... 302/26; 137/625.46; 302/17
[58] Field of Search ............... 302/17, 26; 137/625.18, 137/625.45, 625.46

[56] References Cited

U.S. PATENT DOCUMENTS 3,871,711  3/1975  Rusterholz .......................... 302/26
3,955,853  5/1976  Rusterholz .......................... 302/17

Primary Examiner—Evon C. Blunk
Assistant Examiner—Jeffrey V. Nase
Attorney, Agent, or Firm—Diller, Brown, Ramik & Wight

[57] ABSTRACT

A cyclically operating valve device is disclosed, which is particularly adapted to installations of pneumatic conveyance of incoherent solid materials, said valve device essentially comprising two paired parallel vanes mounted on a common shaft, and a third vane, also mounted on said shaft, which is angularly shifted relative to the other two vanes, so as to provide, in cooperation with the seats and ports provided on the valve body, an orderly sequence of operation according to a preselected operative pattern.

9 Claims, 8 Drawing Figures

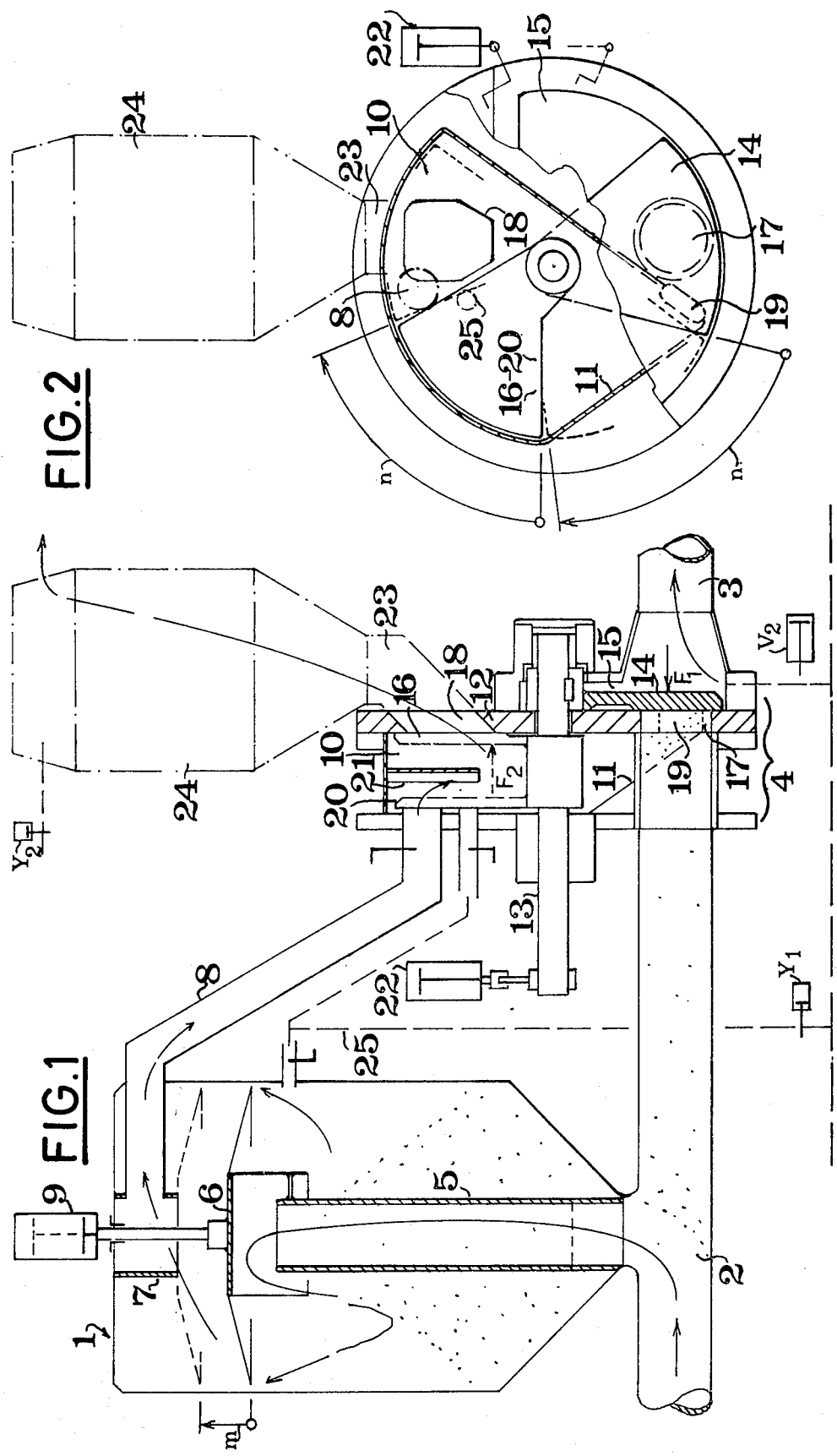

VALVE FOR A PULSE-WAVE PNEUMATIC CONVEYANCE INSTALLATION

This invention relates to a valve for a pulse-wave pneumatic conveyance installation.

In the U.S. Pat. No. 3,871,711 there has been disclosed and claimed a method for the pneumatic conveyance as well as an installation which carries said method into practice, the method, briefly resumed, comprises the step of transferring along a conveyance line a sequence of pneumatic pulse waves. For more details, reference should be had to said Patent.

An object of the present invention is to provide an improved valve construction, characterized in that it comprises a couple of vanes having a generally sectorial shape, mounted on a common shaft and generally parallel to each other, as well as a third sectorial vane, also keyed to the same shaft and similarly staggered with respect to the other two above mentioned vanes, said first two vanes and said third vane being, respectively, adapted to cut off or leave free passageways for the carrier compressed air and/or the incoherent solid material which is conveyed, consistently with the necessities of the operative cycle of the pulse-wave pneumatic conveyance.

The invention will be better elucidated and explained with reference to an exemplary embodiment thereof as illustrated in the accompanying drawings, wherein:

FIG. 1 shows an accumulation and takeup device equipped with the valve means according to the present invention.

FIG. 2 is an illustrative view, in an anomalous cross-section, taken in correspondence with the valve means, so as better to show the latter.

Figure 3:
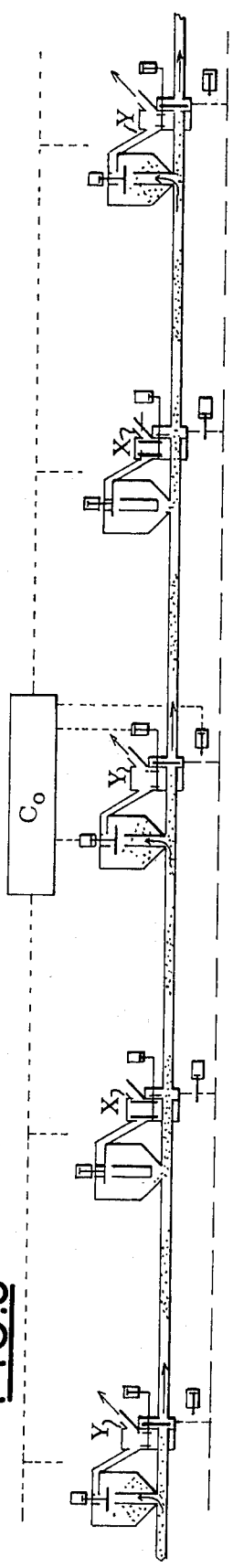
FIG. 3 shows the configuration of a pneumatic conveyance installation at a certain instant of time of its working cycle.

Having reference, at the outset, to FIGS. 1 and 2, it will immediately be noted an accumulation device generally indicated at 1.

The accumulation tank 1 is cylindrical with a conical taper in the bottom section, in the interior of which the lower end of a tube 5 makes a snug fit. The numeral 4 generally indicates the valve device which is the subject-matter of the invention, which will be described in greater details hereinafter. Obviously, the valve device 4 is immediately downstream of the accumulation device. In the latter device, the top end of the tube 5 is preferably surrounded by a circular baffle, or, more specifically, cylindrical baffle, having a top plate 6. The tube 5 is raised and lowered by a lifting mechanism 9 which, in the example shown, is a pneumatically actuated ram; it is obvious, however, that other moving mechanisms can be adopted and, moreover, the function of the baffle 6 can also be performed by a device of the rotary-vane type without thereby impairing the operative principle of the invention. In FIG. 1, the tube 5, is shown as slipped onto the bottom restricted cross-section of the accumulation tank of 1 and, in this position, the area 2 of the line 3 communicates with the top of the accumulation tank of 1 and, in addition, through the bypass 8, with the aforementioned valve assembly 4. When the tube 5 is wholly lifted after having traveled over a stroke indicated at $m$ upwards, the material held in the tank of 1 is allowed to fall into the area 2 of the line 3 and therefrom conveyed downwards, whereas the communication between the tank of 1 and the valve assembly 4 is cut off, the bypass 8 being cut off since the top plate 6 of the baffle abuts the lower edge of a ring 7 which is arranged over the tube 5 and concentrically therewith and also to the above mentioned cylindrical baffle 6.

Coming now to describe in more detail the valve assembly 4, it will be seen that it is composed by a generally triangular chamber 10 in the bottom portion of which there is an incline 11, an intermediate plate 12 having an opening 17 to allow the solid incoherent material to be conveyed to go on, an opening 18 for venting the air as well as an opening 19 to dump the dust from the incline 11. An end lid 15 closes the valve from the front portion in the direction of feed of the material. The movable switching member of the valve is a shaft 13 which carries three vanes 14, 16 and 20 coaxially mounted thereon. More precisely, the vanes 16 and 20 have a sector shape and are generally parallel to each other and properly spaced apart, whereas the vane 14, also of sector-like shape, best seen in FIG. 2, is mounted staggered, for example in a direction of diametrical opposition relative to the vanes 16 and 20. A ram 22, actuated by an appropriate motive fluid and by a leverage known per se, originates the partial rotation of the vane 14, so that the positions of the several component parts are as follows. At a certain instant of time, the vane 14 shuts the conveyance pipeline 3, whereas the vane 20 closes the air feed 25 for the incline 11 while leaving open the communication towards the vent 18 and the connection 8 with the accumulation tank 1 (or with a feeding tank not shown in FIG. 1 but which can be seen in FIGS. 6 and 8 at the left). Meanwhile the vane 16 allows the communication between the valve chamber and the vent 23 which is connected at the end to a filter 24 (FIG. 1). The valve assembly 4, as a whole, makes a stroke of angular width $n$ in either direction. In the position which is reversed over that of FIG. 1, that is, after an angular stroke $n$ as aforesaid, the vane 14 does not cut off the openings 17 and 19 and the vane 20 will close the connection with the bypass 8 while leaving open the point of additional air feed 25 to dump the dust from the incline 11 into the pipeline 3. The vane 16 prevents venting since it closes the window 18. In the space intermediate between the vanes 16 and 20 when these are in the position of FIG. 1, a baffle 21 can be mounted for abating the dust entrained by the vented air, to have the dust falling onto the incline 11. Cleaning of the filter 24 can take place by the agency of an air jet, in an appropriate synchronism with the motion of the other movable component parts of the assembly, said air jet being obtained by quickly opening a valve, $Y_2$, arranged on the filter 24. An air jet controlled by the valve $Y_1$ will assist the material in falling from the incline 11 and from the accumulation tank of 1. The air jet from $Y_1$, can be introduced with a cyclical sequence. The valve which is the subject-matter of the invention, due to the fact that its vanes 14, 16 and 20 slide on the seats with which they cooperate to cut off (or not) the flows of the material and the carrier fluid (air), ensures a more than satisfactory tightness. As a matter of fact, as can be seen in FIG. 1, when air under pressure is fed through the valve V₂, the vane 14 is urged against its seat, that is, against the plate 12 of the valve body (arrow F1). In the reversed position, that is the one which is obtained with an angular stroke n of the shaft 13, the pressure obtaining in the valve chamber 10 presses the vane 16 against the seat 18 and also in this case a perfect tightness is achieved (arrow F2). The shaft 13, in order better to exploit this tightness feature, will be mounted on its bearings so as to have a certain "free slide" in the longitudinal direction, that is, it will be mounted floating in the longitudinal direction; in this way, the clearance takeup is both immediate and automatic and also the possible wear of the rotary bodies (vanes) and of the seats contacting them is compensated. Lastly, throttling members can be provided on the bypass 8 as well as on the branch-off of the line 25 as has been symbolically shown in FIG. 1.

Under limiting conditions, the vanes 16 and 20 could be combined into a single vane, should the working conditions be especially favourable.

The structure and the operation of the valve the subject of the invention having thus been illustrated, it will be fitting to point out a few additional novelty features introduced with the present invention.

By observing closely the accumulation tank 1 and its service members, it will be seen that there is now the automatical opening and closing of the bypass 8 concurrently with the lifting and depressing motion of the tube 5. By so doing, the operation of the whole assembly is improved in the critical instant of time of the reversal of the position of the valve members, making virtually constant the pressure drop and thus also the flow of the mixture between the carrier fluid (air) and the incoherent solid material. In addition, the possibilities of clogging are virtually done away with, that which is an adavantage especially in the vertical portion of the pipe (risers). Inasmuch as it becomes possible to close the bypass 8 with an advance, the advantage is achieved of an easier cleaning of the filters 24 since the cleaning jet is unhindered. The advanced closure of the bypass 8 also affords the precious advantage of pressurizing the accumulation tank and the duct upstream of the valve 4 and this fact permits both to throw the motionless material ahead again and to brake the motion of the material along the conveyance line. The throttling members outlined above, where they are provided, offer, lastly, an additional possibility for an accurate adjustment of the operation of the entire assembly.

The valve assembly 4, the principal subject-matter of the invention, has been already disclosed above: the rotary rather than reciprocal operation affords an improved reliability and permits better to keep under control the critical transitional stage which corresponds to the position reversal of the valve members proper.

For example, the vane 20, by preventing a direct communication between the lid 15 and the venting port 23 (FIG. 1) during the opening and closing motion of the line 3, eliminates a serious operative problem. In designing, lastly, the shape and the angular width of the vanes can conveniently be changed according to the requirements and can be modified, while remaining within the scope of the invention, also the positional relationships between the rotary component parts of the valve assembly 4 and the openings that they are sequentially called to open and to close, in synchronization with the working cycle of the entire conveyance installation.

Figure 4:
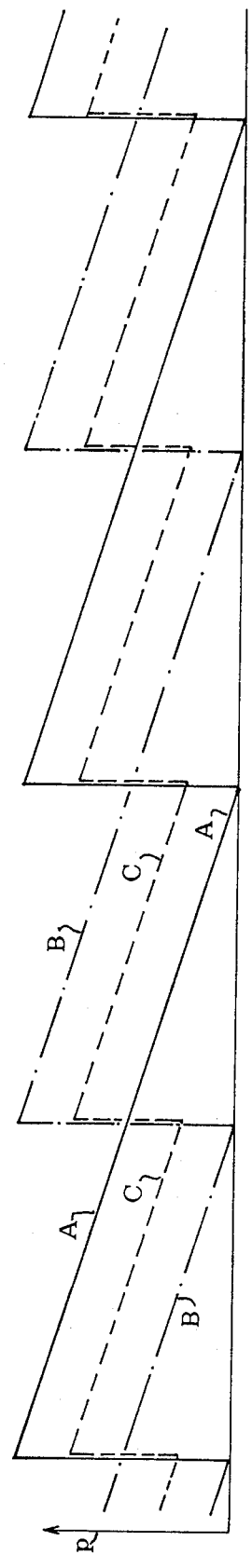
FIG. 4 is a set of plots which show the trend of the pressure along the line in the positions of FIG. 3 and FIG. 5 and at an intermediate position as well.
Figure 5:
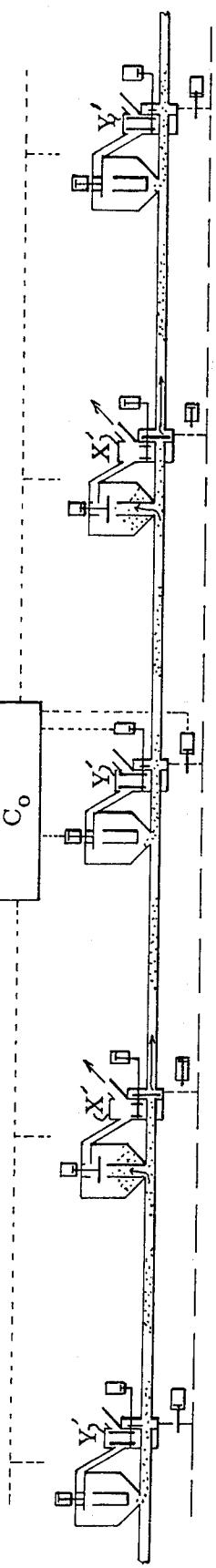
FIG. 5 shows the configuration of the installation shown in FIG. 3 but in a subsequent instant of time.

These advantages and features can be better appreciated by observing FIGS. 3, 4 and 5 together.

FIG. 3 diagrammatically shows a long pneumatical conveyance line according to the above mentioned Patent, having accumulation and takeup devices for the material as already described in the introductory portion of this specification. The several members, through symbolized, can easily be found. A central control C₀ provides to synchronize all the movements of the movable component parts. The positions as indicated at X indicate the devices in correspondence with which the conveyance pipeline is not cut off, whereas the letter Y indicates those accumulation and takeup devices which are in a line-cutoff position.

FIG. 5 illustrates the position of the line and of the several members at a subsequent instant of time wherein the positions of the movable members are reversed and this fact is indicated with the respective letters X' and Y'. For the remainder, the diagrams of FIGS. 3 and 5 can be understood without any necessity for further legends.

In FIG. 4 there is a plot of the working pressures and the plot corresponds, on the abscissae, to the positions of the members of the installation as in FIGS. 3 and 5. More exactly, the plot A refers, point for point, to the positions of FIG. 3, the plot B to that of FIG. 5 and the dotted plot C to the instant at which there is the reversal of the positions of the several movable members. The representative plots are indicative and are intended only to illustrate how, in practice, at every instant of time of the operation of the installation, the pressure differential is maintained virtually constant at every respective position of the movable members, that which is just what it was desired to achieve with the rotary valve according to the present invention and the other improvements disclosed hereinabove.

The transition from a pressure differential such as A, through the pressure differential C, to the differential B, takes place according to the following sequence:

Closing the air jets in the devices Y of FIG. 3, cutoff of the pipeline and opening of the carrier air in the devices X: simultaneously, the tube 5 is depressed and the connection of the bypass 8 in the devices such as X is opened whereas in the devices such as Y the tube 5 is lifted and the corresponding connection with its bypass 8 is closed and the conveyance pipeline in the devices Y is opened.

These operations require an extremely short time in the order of a fraction of a second, and are properly synchronized by the control central station C₀.

Figure 6:
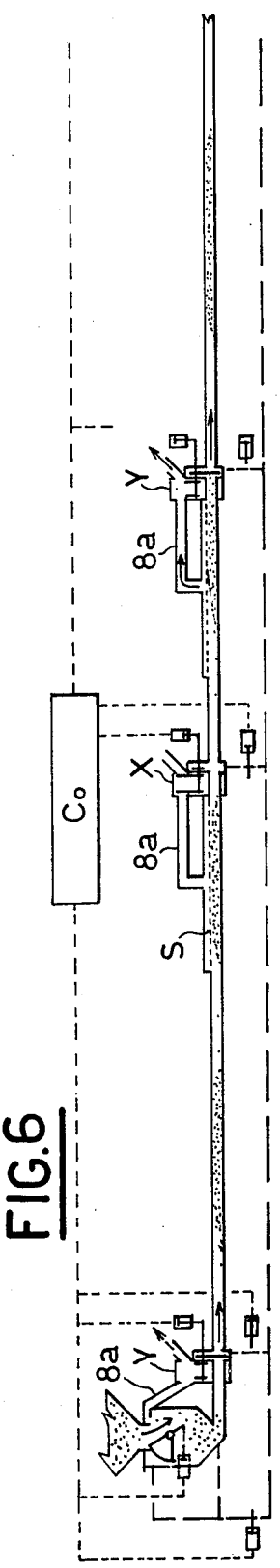
FIGS. 6, 7 and 8 are similar to FIGS. 3, 4 and 5 but show also the initial feeding section of the conveyance line.
Figure 7:
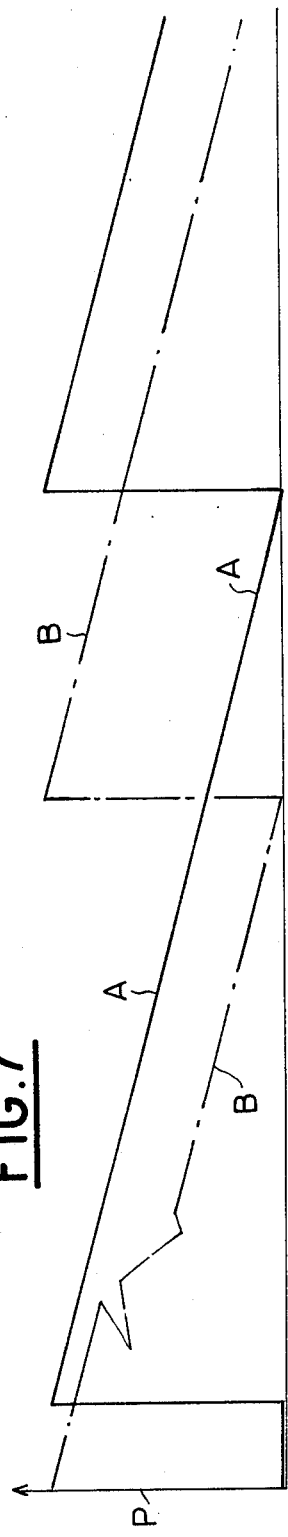
Figure 8:
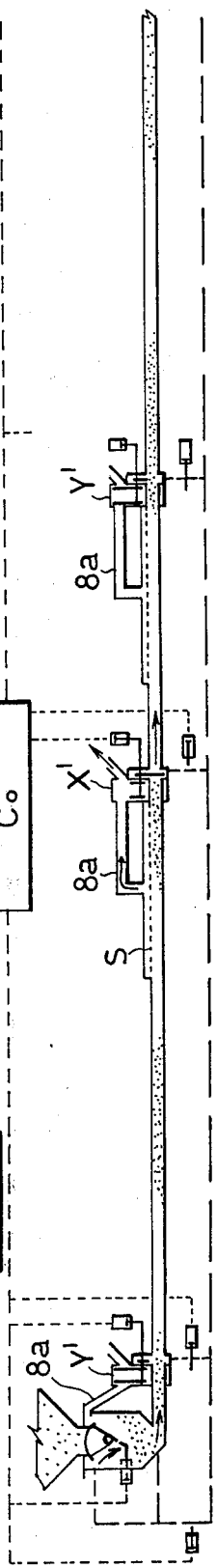

FIGS. 6, 7 and 8 show an exemplary modification of the installation shown in FIGS. 3, 4 and 5. In FIGS. 6 and 8, more particularly, there can be seen, on the left side, the initial feeding members of the installation.

It is observed that, similarly to what had been seen for FIGS. 3 and 5, FIGS. 6 and 8 show the conveyance installation in two subsequent working positions.

More particularly, Y and Y' in FIGS. 6 and 8 have exactly the same meanings they had in FIGS. 3 and 5, and the same is true of the members X and X'. It is to be observed now, only that the accumulation of the material takes place by means of a simplified device. It comprises a net S which retains the granular material (the modification which is being described now is particularly adapted to granular materials) but allows the flow of air. Air is vented through a bypass 8a (similar to the bypass 8 of FIG. 1) which has an extremely simple structure. As in FIG. 1, the bypass is connected to the valve body (X, X', Y, Y'). The operation is similar to that which has already been disclosed in connection with FIGS. 3 and 5 so that it will be no longer described. The same applies to the centralized control $C_o$.

The plot of FIG. 7 is similar to that of FIG. 4, but there is the difference that the pressure differential in the initial trunk of material feeding can now be seen. As before, the plot A now refers to the position of FIG. 6, whereas the plot B refers to the position of FIG. 8. The plot of FIG. 7 represents the trend of the pressure along the pipeline and it can be seen that the lines of the pressure trend in the respective positions of FIG. 6 (line A) and of FIG. 8 (line B) are shifted (contrary to FIG. 4 where the lines A and B virtually repeated the even spacing between the consecutive stations (X, Y, X', Y')) because it has been preferred to approach along the line the stations X, Y, X', Y' virtually pairwise, that is, in sets of two stations X, Y, placed side by side. By so doing, an improved efficiency of the installation as a whole is achieved.

It will be observed, by way of conclusion, that the valve in question can altogether be mounted, not only along the pipeline in close pairs, or also as units which are evenly spaced apart along the line, but, above all, in the initial feeding portion of the line, coupled to the feeding device (loading tank and its adjoining component parts).

What I claim is:

1. A valve device particularly adapted for cyclically cutting off the flow of a carried fluid (air) and of a solid incoherent material in a pneumatic conveyance installation in which the advance of said fluid and said material takes place by the agency of cyclical pulse waves, said valve device comprising a housing and valve elements; said housing including a body, first and second end plates, and a discharge conduit; said end plates and said body in combination defining a valve chamber, said valve elements including a shaft rotatably journalled in said housing and passing through at least said valve chamber and said second end plate, first and second entrance passages through said first end plate into said valve chamber, a first vane carried by said shaft for rotation therewith and cooperation with said first end plate selectively separately to close said entrance passages, a vent passage from said valve chamber through said second end plate, a second vane carried by said shaft for rotation therewith and for cooperation with said second end plate for closing said vent passage at a time when said first vane has closed said second entrance passage, a discharge passage through said second end plate from said valve chamber remote from said vent passage, a supply passage through said second end plate adjacent said discharge passage and independent of said valve chamber, said discharge passage and said supply passage opening into said discharge conduit, and a third vane carried by said shaft for rotation therewith and for cooperation with said second end plate for closing said discharge passage and said supply passage when said first entrance passage is closed and said second entrance passage and said vent passage are open, the relationship of said vanes and said passages being one wherein when said shaft is rotated to open said first entrance passage said vent passage and said second entrance passage are closed and said discharge passage and said supply passage are open.

2. The valve device of claim 1 wherein said shaft is mounted in said housing for limited axial movement, said third vane is within said discharge chamber, and there are means for pressurizing said discharge chamber when said third vane is in that position closing said discharge passage and said supply passage to urge said third vane into sealing relation relative to said second end plate.

3. The valve device of claim 2 wherein said second vane is within said valve chamber and movable with said shaft toward said second end plate by pressure within said valve chamber to seal said vent opening.

4. The valve device of claim 1 wherein said first and second vanes are of like appearance and in alignment on said shaft.

5. The valve device of claim 1 wherein said valve chamber is disposed in an upright position and has a narrow bottom portion, and said discharge passage is aligned with said bottom portion for the gravity flow of solid inhoherent material through said discharge passage.

6. The valve device of claim 5 wherein said bottom portion slopes downwardly from said first end plate toward said second end plate.

7. The valve device of claim 1 wherein second entrance passage and said vent passage are generally aligned longitudinally of said shaft, and there is a baffle within said valve chamber between said second entrance passage and said vent passage.

8. The valve device of claim 1 wherein said first and second vanes are disposed within said valve chamber, and said third vane is disposed within said discharge conduit.

9. The valve device of claim 1 wherein said second and third vanes are disposed on opposite sides of said second end plate.

* * * * *